United States Patent
De Vries

[11] 3,734,231
[45] May 22, 1973

[54] TRANSPORT MEANS OR VEHICLE, OR A FLUID BED

[76] Inventor: Robert De Vries, 2 Valeriusstraat, Hague, Netherlands

[22] Filed: Mar. 10, 1971

[21] Appl. No.: 122,873

[30] Foreign Application Priority Data

Mar. 16, 1970 Netherlands ..................7003680

[52] U.S. Cl. ...................................180/125, 214/1 BE
[51] Int. Cl. ...........................B60v 1/04, B65g 7/06
[58] Field of Search.........................180/125, 124; 214/1 BE

[56] References Cited
UNITED STATES PATENTS

| | | |
|---|---|---|
| 2,938,590 | 5/1960 | Barnett..............................180/125 |
| 3,124,209 | 3/1964 | Flipse................................180/125 X |
| 3,209,929 | 10/1965 | Petersen et al.......................180/125 |
| 3,318,557 | 5/1967 | Zhed et al...........................180/125 X |
| 3,513,934 | 5/1970 | Crowley..............................180/125 X |

Primary Examiner—Kenneth H. Betts
Attorney—Lester Horwitz

[57] ABSTRACT

A vehicle comprising a bottom plate adapted to be supported on a gas cushion, said bottom plate having a flat bottom surface and series of grooves therein, the grooves of each series being substantially parallel to each other, and said series extending at an angle to each other, whereby all the grooves are in open connection with each other when a gas cushion is to be formed between said bottom plate and a flat supporting surface under it to facilitate the initial raising of the vehicle.

1 Claim, 10 Drawing Figures

PATENTED MAY 22 1973 3,734,231

INVENTOR
Robert devin

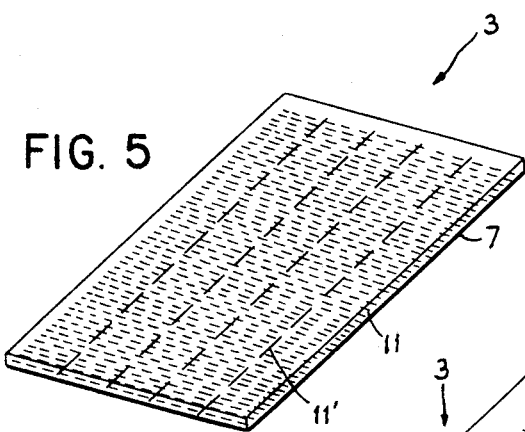
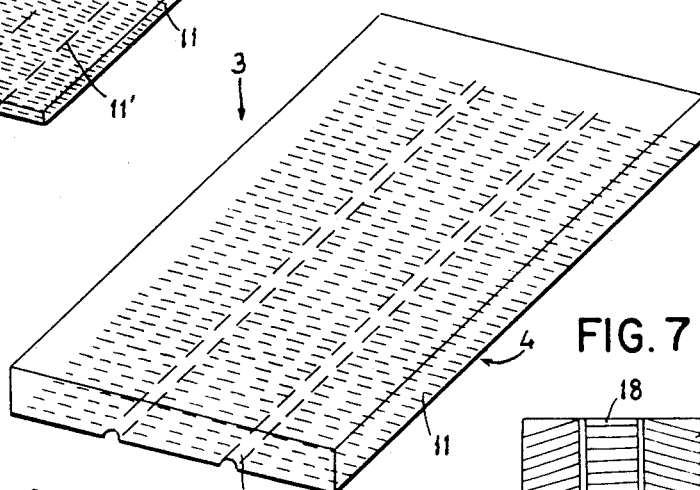
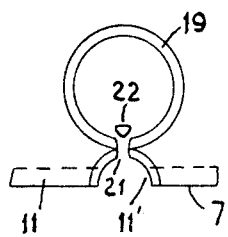
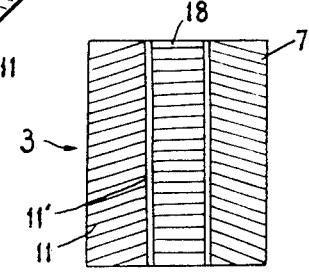
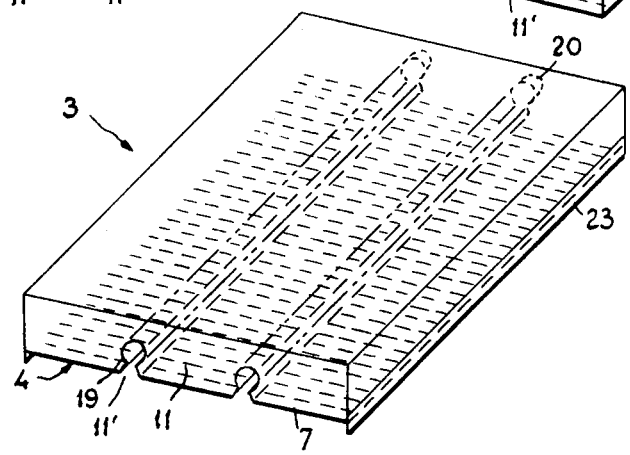
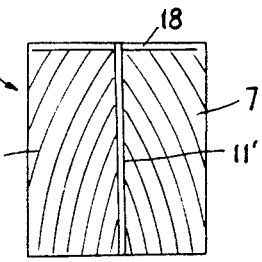

3,734,231

TRANSPORT MEANS OR VEHICLE, OR A FLUID BED

BACKGROUND OF THE INVENTION

This invention generally relates to a transport means or vehicle provided with a bottom plate or platform on which a load can be placed, and under which a pressure fluid can be supplied to form a supporting fluid cushion on which the bottom plate can be lifted and moved.

The invention is also aimed at a fluid bed comprising a bottom plate or platform on which a load can be placed, and a supporting surface or floor under it, on which the bottom plate can be lifted and moved by supplying a pressure fluid between the bottom plate and the supporting surface.

In prior devices of the latter type the bottom plate and the supporting surface under it are initially flat against each other, and the pressure fluid usually consisting of pressure air is supplied between the bottom plate and the supporting surface through a great number of openings in the bottom plate or the supporting surface. The pressure area on which the pressure fluid is acting to lift the bottom plate off the supporting surface is in that case, however, only equal to the total sectional area of the supply openings so that for initially lifting the bottom plate in order to be moved a very high pressure is required, which is much higher than the pressure which is afterwards required for the motion once the bottom plate is lifted off the supporting surface with the pressure fluid acting on the entire area of the bottom plate.

Such a condition is also present in the more general embodiment as a transport means or vehicle which is adapted to move along any supporting surface. A high starting power is required for the lift off.

SUMMARY OF THE INVENTION

The present invention has as its object to overcome the aforesaid disadvantage of prior cushion borne vehicles so that a lower starting power is required for the lift off.

According to the invention this improvement is effected by a surface outline of the fluid cushion in the form of series of grooves, the grooves of each series being parallel to each other, and said series extending at an angle to each other, whereby all the grooves are in open connection with each other.

The type described as a fluid bed in the foregoing may also comprise a bottom plate and a supporting surface under it, each consisting of a plate which is provided with ribs on the side of the fluid cushion, said ribs extending in one plate parallel in a first direction, and in the other plate in a second direction substantially at right angles to said first direction, with the pressure fluid being supplied in the fluid cushion through one or more openings in the grooves between the ribs of the bottom plate. Due to the positioning of the ribs in the respective plates, at right angles to each other, a great number of connecting passages are formed so that all parts of the space between said plates are directly to be reached by a pressure fluid which is introduced therein. The pressure fluid is now directly acting on a much greater area so that for the initial raising of the bottom plate a much lower pressure is required than in the prior devices of this type, said pressure for the lift off now being not much greater than the pressure which is afterwards required for the motion, since said initial pressure can immediately act on all parts of the bottom plate between the ribs, and on the non-abutting parts of the respective ribs, which parts are directly to be reached by the fluid.

In one embodiment of the invention the plates are of concrete, with the ribs being formed by a corrugated, fluted or ribbed and grooved metal plating which is attached to the concrete. The plates obtain their bearing-power from the concrete which may or may not be reinforced or may be strengthened by beams, the ribs forming guiding or sliding surfaces when the plates move along each other.

The invention can also be realized in such a way that the ribbed bottom plate is included as a bottom plate in the actual structure of a container.

In the general embodiment as a transport means or vehicle a surface outline of the fluid cushion in the form of series of grooves with said series at right angles to each other is also preferred. A practical embodiment is characterized in that the bottom surface of the bottom plate is provided with series of grooves, the grooves of each series being parallel to each other, and said series extending at an angle to each other, whereby all the grooves are in open connection with each other. Preferably also in that case the bottom surface of the bottom plate is provided with series of grooves with said series at right angles to each other.

In a preferred embodiment the bottom surface of the bottom plate has series of grooves, each series comprising a great number of smaller grooves substantially parallel to each other, and at an angle thereto and/or at right angles thereto a smaller number of larger grooves parallel to each other, or one larger groove, with pressure fluid being supplied to said one or more larger grooves. Coupled to a propulsion unit said one or more larger grooves can partly or wholly be in open connection with one or more jets over their length, with said one or more connecting openings or slits being adjustable to control the fluid supply to the fluid cushion. Further said one or more jets can also be provided with adjustable nozzles. This can also be effective to provide a directing or steering effect.

The invention is described in more detail in the following specification with reference to the drawings, in which examples of the invention are shown.

BRIEF DESCRIPTION OF THE DRAWINGS

FIG. 5 is a view of a general embodiment of the invention as a transport means or vehicle having a carrying bottom provided with crossing series of parallel grooves;

FIGS. 6-8 show in various embodiments a carrying bottom having some series comprising a great number of smaller grooves, and at an angle thereto or at right angles thereto a pair of larger grooves, or one larger groove;

FIG. 9 shows a carrying bottom of a transport means or vehicle in connection with a propulsion unit; and FIG. 10 shows the adjustable fluid connection between a jet and a large carrying bottom groove.

DESCRIPTION OF THE PREFERRED EMBODIMENTS

Figure 1:
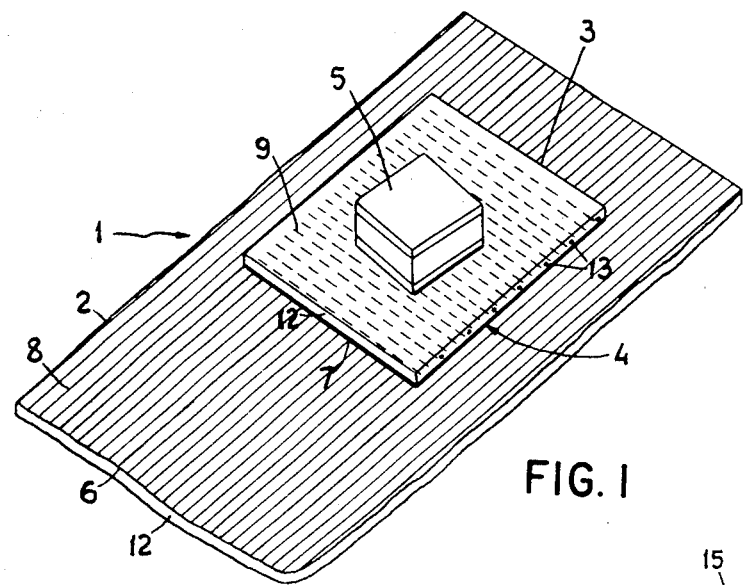
FIG. 1 is an isometric general view of a transport bed to be fluidized, according to the invention.

In FIG. 1 a part of a transport bed generally indicated with 1 is seen, comprising a supporting floor 2, along which at least one carrying platform 3 can be moved by providing a pressure fluid cushion 4 between the supporting floor 2 and the carrying platform 3. To that effect pressure air, for instance, is supplied between the supporting floor 2 and the platform 3 so that the platform is lifted from the supporting floor to bear on the air cushion. A heavy load 5 can bear on the platform 3, but due to the fluid cushion 4 the platform 3 with the load 5 bearing thereon can easily be moved along the transport floor 2 With the use of only a low force, as is known.

Once the carrying platform 3 and the load 5 are carried by the fluid layer 4, only a low pressure is to be maintained in the cushion layer 4, while constantly supplying fresh pressure air to compensate for the leakage losses along the edges of the platform 3. A disadvantage of the known devices of this type, however, is that to bring the platform 3 initially off the floor 2 a much higher pressure is required, the carrying surfaces of the floor and the platform in all known cases always being as smooth as possible and bearing flat against each other. This makes it necessary to bring the carrying surfaces first from each other with a high initial pressure or a pressure blast to provide a cushion layer 4 in the then formed interspace. After that it does not require a high pressure to maintain the cushion 4.

The invention now provides a transport device comprising a fixed supporting floor 2 and a platform 3 which is movable thereon, and normally rests on the floor but by supplying pressure fluid under it can be lifted from the floor 2 to be carried by the fluid so as to be easily moved along the floor. To facilitate the lift-off from the floor now, however, an always existing space between the top surface of the floor and the bottom surface of the platform is provided, having supply openings, through which pressure fluid can be introduced in said space to lift the platform from the floor for moving purposes. Said pressure space 4 is formed between two plate surfaces 6 and 7 on top of the floor 2 and on the bottom side of the platform 3 respectively, one of which has ribs and interjacent grooves in a first direction, and the other having ribs and grooves in a second direction substantially at right angles to said first direction.

Figure 2:
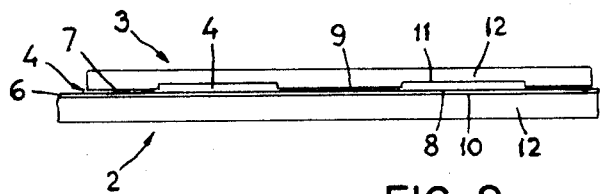
FIG. 2 is a detail view in section of a small part of the fluid bed.

In FIG. 1 and 2 the ribs in the top plate 6 of the floor 2 are indicated with 8 and the ribs in the bottom plate 7 of the platform 3 with 9. Due to the crosswise course of the interjacent grooves, of which those in the floor 2 are indicated with 10 and those in the platform 3 with 11, said grooves are always communicating with each other so that when initially supplying the carrying fluid, it immediately covers the entire supporting surface. This results in the pressure fluid now acting directly on a great area so that for lifting the platform 3 with the load 5 placed thereon now a much lower pressure is required than in the prior devices of this type.

In FIG. 2 a detail sectional view of a portion of the supporting floor 2 and the carrying platform 3 is shown. Preferably both the supporting floor and the platform constitute a self-supporting structure. According to the invention said structure comprises a concrete slab 12 on which a ribbed plate 6 or 7 is attached, said plate of course being arranged on top of the floor 2 and at the bottom against the platform 3 respectively. The concrete 12 forms the strength member and is usually reinforced. The pressure fluid is supplied in the pressure space 4 below the platform 3 through a number of openings 13 in the platform. Said openings 13, which are shown at the side of the platform 3 in FIG. 1, are connected to a manifold line which is not shown in said figure, to which line the pressure fluid is supplied from a pressure source which is also not shown.

Figure 3:
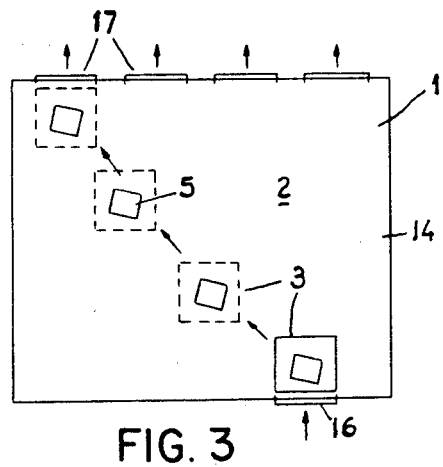
FIG. 3 is a schematic plan view of a transport floor, along which a carrying platform can move.

FIG. 3 shows a transport floor 2 in a shed 14, on which floor heavy loads 5 such as containers 15 or large loading cases can be moved by means of a fluid cushion. At 16 an entrance gate is indicated, through which containers or the like are supplied to be carried off through one of the exits of the shed 14, indicated at 17, to the selected destination. During the transport along the floor 2 in the shed 14 the carrying platform 3 remains oriented in substantially the same direction on the supporting floor 2 so that the respective ribs 8,9 and grooves 10,11 in the floor and the platform respectively remain substantially at right angles to each other.

Figure 4:
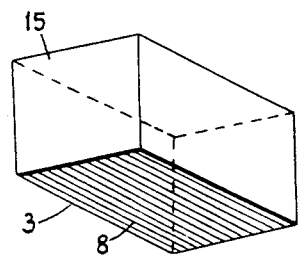
FIG. 4 is an isometric bottom view of a container, the bottom surface of which is formed by a built-in carrying platform.

FIG. 4 shows an embodiment of the invention, with the carrying platform 3 which is ribbed at the bottom side being incorporated in the structure of a container 15 to form the bottom surface thereof. The pressure source, from which the carrying fluid is supplied under the ribbed bottom surface of the container, is arranged within or on the container 15, or the fluid is supplied thereto through a pressure air connection for instance.

A more general embodiment of the invention as a transport means adapted to be moved along any supporting bottom layer is illustrated in FIGS. 5 to 10. Incidentally it is observed that in said figures the parts which correspond to those from the preceding figures, are indicated with the same reference numerals. Said transport means which can be used on any bottom ground has a carrying bottom 3, the bottom surface 7 of which having series of grooves 11 and 11', with the grooves of each series being parallel to each other, and said series extending at an angle to each other. At the crossings the grooves 11 and 11' are in open connection with each other so that the entire bottom surface 7 of the carrying bottom 3 is immediately to be reached by a pressure fluid which is supplied under it, the carrying cushion 4 to be formed directly covering the entire carrying area 7 to facilitate the lift-off of the transport means from the bottom ground.

In the Figures communicating series of smaller grooves 11 and larger grooves 11' are shown, said series extending at right angles to each other, except in FIG. 7 and 8, in which also series of grooves 11 and 11' extending at different angles are seen. In FIG. 7 the series extend only in the central part of the carrying surface 7 at right angles. The series of smaller grooves 11 at the sides recede somewhat rearwards. The pressure fluid supply takes place through a manifold line 18 which is connected to a pair of larger longitudinal grooves 11'. In FIG. 8 at the sides series of smaller grooves 11 bending rearwards are seen, terminating at a larger central groove 11', or a manifold line 18 provided at the front of the transport means.

In FIG. 9 a transport means according to the invention is illustrated and connected thereto a propulsion unit comprising one or more jets 19 which are provided with adjustable jet nozzles 20. By a separate jet control with various nozzles 20 or by means of one adjustable central nozzle 20 an orienting or steering effect can be obtained.

As shown the jets 19 extend along one or more larger grooves 11' in the bottom surface 7 of the carrying plate 3, with the grooves 11' being partly or wholly in open connection with the co-extensive jets 19 over their length, said open connection being indicated at 21 in FIG. 10, in which a cross-sectional view of a larger groove 11' and a jet 19 connected thereto is seen. Said connection 21 can comprise one or more openings or slits and is controllable by means of an adjustable control device 22, as indicated in FIG. 10. Accordingly the supply of pressure fluid from jets 19 to the carrying cushion 4 can take place in a controllable manner. To prevent the fluid from escaping from the carrying cushion as much as possible, skirt closures 23 are provided along the bottom edges as required, as schematically shown in FIG. 9. It is observed that in order not to obstruct the view on the more essential parts of the device, the skirts 23 at the front side of the carrying bottom, against which is seen, are not shown.

Finally it is observed that the embodiments of the invention, which are described in the foregoing, are only by way of example and thus are not to be interpreted in a limiting sense. Within the scope of the invention special closures can be provided along the bottom edges of the carrying platform, or other arrangements be provided, and variations or modifications be effected.

Having thus described my invention, what I claim is:

1. A conveying means comprising a plate having a bottom surface formed with a plurality of relatively small adjacent fluid conveying means on which surface a pressure fluid is to be supplied to form a fluid cushion to lift and move a load, characterized in that said fluid conveying means comprise a series of relatively smaller grooves which are substantially parallel to each other and at least one relatively large groove extending to an angle to said smaller grooves and intersecting all said smaller grooves to form a great number of interconnecting fluid passages.

* * * * *